United States Patent [19]
Olson et al.

[11] Patent Number: 5,454,595
[45] Date of Patent: Oct. 3, 1995

[54] HIDDEN VOLUME CUSHION

[75] Inventors: Brent K. Olson, Clearfield; Kirk Storey, Farmington; Davin Saderholm, Salt Lake City, all of Utah

[73] Assignee: Morton International, Inc., Chicago, Ill.

[21] Appl. No.: 302,525

[22] Filed: Sep. 8, 1994

[51] Int. Cl.⁶ ............................................. B60R 21/16
[52] U.S. Cl. ................... 280/743.1; 280/729; 280/739
[58] Field of Search .......................... 280/739, 729, 280/728 R, 743 R, 731, 732, 740

[56] References Cited

U.S. PATENT DOCUMENTS

| | | | |
|---|---|---|---|
| 3,473,824 | 10/1969 | Carey et al. | 280/150 |
| 4,186,941 | 2/1980 | Scholz et al. | 280/743 R |
| 5,100,172 | 3/1992 | Van Voorhies et al. | 280/738 |
| 5,193,847 | 3/1993 | Nakayama | 280/738 |
| 5,246,250 | 9/1993 | Wolanin et al. | 280/739 |
| 5,249,824 | 10/1993 | Swann et al. | 280/729 |
| 5,290,061 | 3/1994 | Bollaert | 280/743 R |

FOREIGN PATENT DOCUMENTS

| | | | |
|---|---|---|---|
| 553542 | 8/1993 | European Pat. Off. | 280/743 R |
| 2944319 | 5/1981 | Germany | B60R/21/10 |
| 3-67749 | 3/1991 | Japan | B60R/21/18 |
| 3-136943 | 6/1991 | Japan | 280/728 R |
| 3-281460 | 12/1991 | Japan | B60R/21/24 |

*Primary Examiner*—Eric D. Culbreth
*Attorney, Agent, or Firm*—George W. Rauchfuss, Jr.; Gerald K. White

[57] ABSTRACT

In an airbag restraint system for automobile passenger safety, an airbag having a flexible fabric airbag wall defining an inflation chamber with a mouth in said airbag wall for communication of the closed inflation chamber with an inflator, has a portion of said airbag wall tucked inside the inflation chamber and held there by strips permanently attached to panels of the airbag wall parallel to fold lines on said panels where the tucked in portion of the airbag wall turns into the airbag. Those strips extend outward beyond said fold lines and are joined there by a weak seam that can be broken by tension in the airbag walls caused by inflation of the airbag to a desired inflation pressure. When the weak seam breaks, the strips are released and the tucked in portion of the airbag will be deployed and inflated to increase the volume capacity of the airbag and thereby decrease pressure in the airbag.

19 Claims, 4 Drawing Sheets

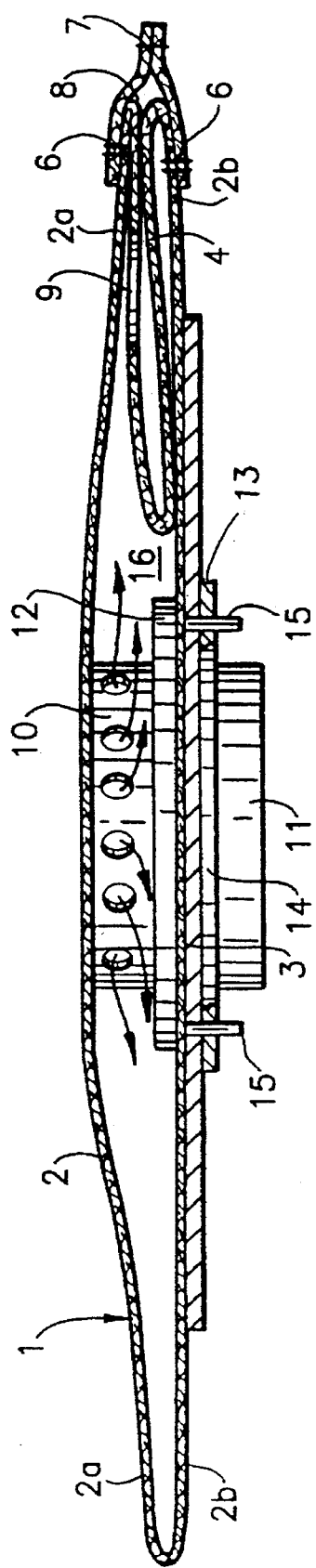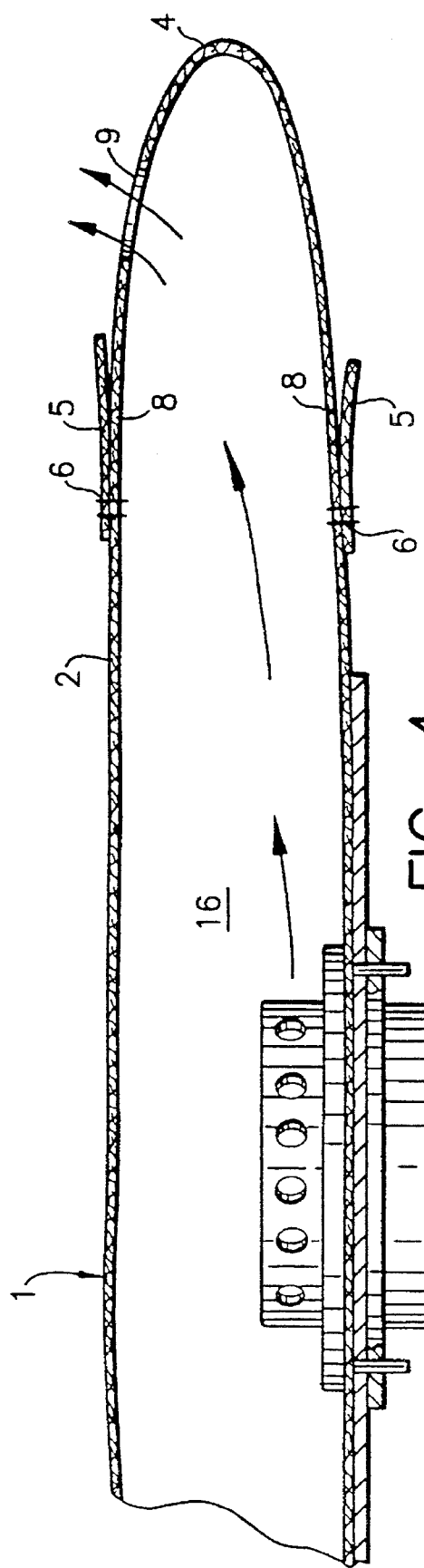

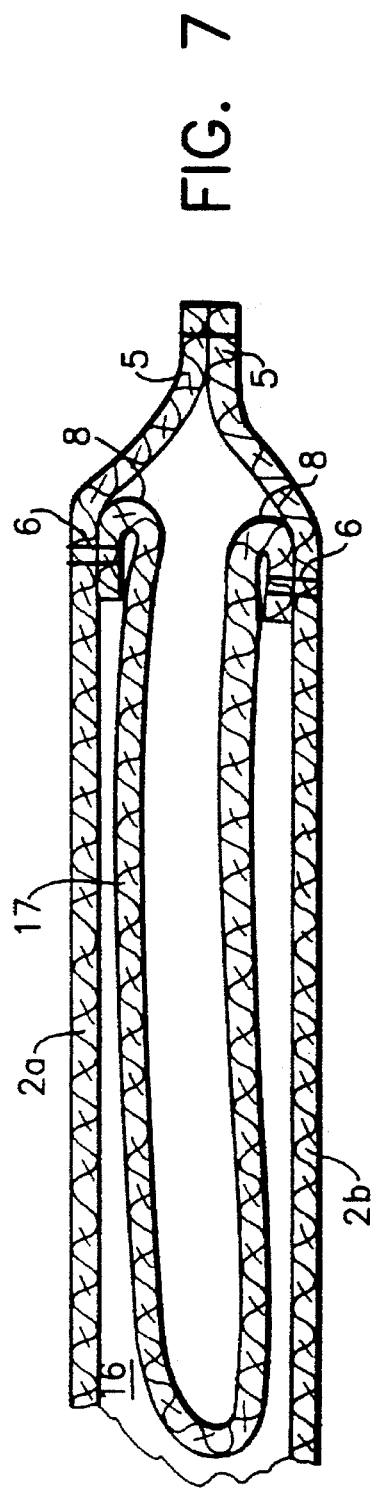
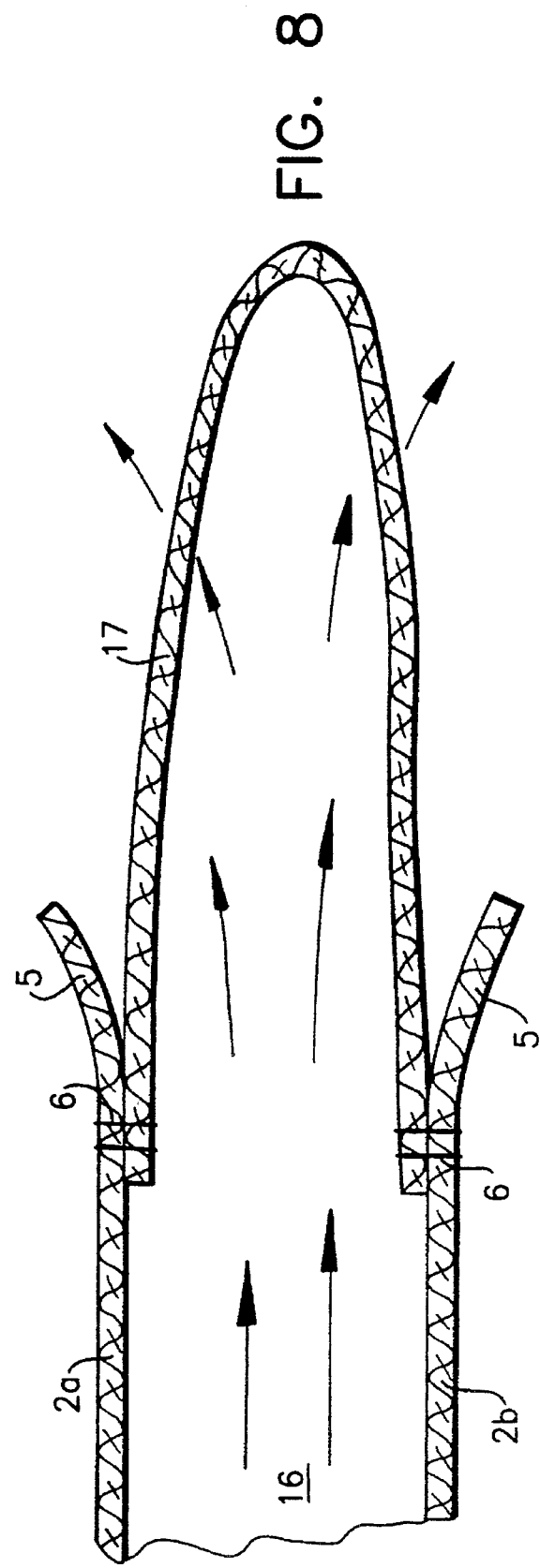

HIDDEN VOLUME CUSHION

FIELD OF THE INVENTION

The invention relates to improvements in airbag restraint systems for automobile passenger safety, and more particularly to improved structure of airbags for use in such systems.

BACKGROUND OF THE INVENTION

Airbag modules currently used in automobiles comprise an inflator for rapid generation of gas, activated upon rapid deceleration of the automobile as in a collision, and an airbag which will be deployed and inflated by gas from the inflator. The inflated airbag provides a cushion in front of a driver or passenger to arrest motion of the driver or passenger in a collision.

For an airbag restraint system to be effective, the inflator must produce a volume of gas very rapidly at pressure sufficient to deploy the airbag from a container in which the airbag is stored and to inflate the deployed airbag. This must all happen in the instant after a collision, to provide a restraining cushion in front of the driver or passenger as he is hurled forward or sideways by momentum. The cushion prevents him from striking a steering wheel or windshield or another part of the automobile. A problem in designing airbag modules is to generate enough gas fast enough and with sufficient pressure to deploy and inflate the airbag in that instant after collision, and without over inflating the airbag to a pressure that will make the airbag so hard that it becomes an unsafe object for the driver or passenger to strike. To deal with this problem designers have provided airbags which inflate in stages, first at initial pressure sufficient for rapid deployment and inflation, then in a second stage to relieve some of the pressure and provide a firm but softer cushion for safer restraint.

Several prior art designs have used airbags with variations on this two stage inflation principle. U.S. Pat. No. 5,290,061 described an airbag with a lower end portion of the bag folded inside a lower end portion of the bag prior to inflation. Upon inflation, the upper end portion was inflated and the folded in lower end portion would emerge and be inflated by expansion of compressed gas from the upper end portion. There was no means for restraining or controlling the emergence of the lower end portion from inside the upper end portion.

German Patent No. 2,944,319 described an airbag having two inner chambers. Before inflation, the two chambers were separated by a stitched seam across the center of the bag. In the first inflation stage, one of the chambers was inflated. When the first chamber had been fully inflated, gas pressure in the inflated first chamber caused the walls of that chamber to rip out the stitching, thus joining the second chamber to the first to provide added volume that would be filled by expansion of gas from the first chamber. When the airbag would be deployed, both of the two chambers would be deployed together. Until the uninflated second chamber was inflated, some time after deployment, it could freely flap within the passenger compartment, possibly causing harm by striking a passenger.

BRIEF DESCRIPTION OF THE INVENTION

The present invention provides an airbag which deploys and inflates rapidly in a first stage and then in a second stage opens additional "hidden" volume inside the airbag to decrease pressure as the gas expands to inflate the added volume. Optionally, the invention may further provide means for accelerating the deflation of the airbag after the second stage is executed.

The invention is an airbag comprising a wall of flexible fabric, such as a nylon fabric coated with neoprene, enclosing an inflation chamber, and with a mouth in the wall for communication of the inflation chamber with an inflator. Before inflation, the wall of the bag is collapsed and packed inside a suitable container or canister. A portion of the airbag wall is folded and tucked inside the remaining portion of the airbag to reduce the initial volume capacity of the inflation chamber. The portion of the wall that is tucked inside is held there by opposed strips which extend along opposed fold lines where the tucked in portion of the wall turns into the inflation chamber. These strips are permanently attached to the airbag on lines near and parallel to the fold lines. The strips may be permanently attached to the airbag wall by means of stitching or other suitable permanent binding means.

In some embodiments, the strips may be extensions from a portion of the airbag wall, as will be explained. The opposed strips are wide enough to extend a short distance out beyond the opposed fold lines. The opposed strips are bound together there by a weak, rupturable seam parallel to the fold lines, of weak stitching or other suitable weak binding means. This weak seam holds the strips together until the bag reaches a certain level of inflation in the first inflation stage. During this stage, the portion of the airbag wall that is tucked into the airbag cannot be inflated while it is held inside by the opposed strips which are bound by the weak seam.

As the inflation chamber is filled on being inflated, the wall of the airbag is strained by gas pressure inside the bag, but the tucked in portion cannot be inflated while the strips are bound together. Near the end of this first inflation stage, the wall of the bag is strained to a point at which the strips attached to the wall are pulled apart by tension in the wall, tearing the weak seam and releasing the strips. With the strips released, gas pressure inside the airbag forces the tucked in portion of the airbag wall out of the airbag thereby adding the additional volume capacity of that portion to the volume capacity of the inflation chamber. With the volume capacity of the airbag enlarged, gas in the bag expands to fill the added volume, reducing gas pressure in the airbag. If more deflation is desired, the tucked in portion of the airbag wall may comprise gas vents in its wall, or may be made from gas permeable fabric, to release pressurized gas from inside the bag when that portion is deployed.

Preferred embodiments of the invention will be described in more detail by reference to the Drawings.

DESCRIPTION OF THE DRAWINGS

In the drawings.

FIGS. 3 and 4 are cutaway sections of the airbag structures taken along lines 3—3 and 4—4, respectively, in FIGS. 1 and 2 and further showing an assembly of parts joining the airbag to an inflator at the mouth of the airbag.

FIGS. 7 and 8 are cutaway sections, similar to FIGS. 5 and 6, showing another variation in the hidden portion of the airbag structures.

DETAILED DESCRIPTION OF THE INVENTION

Figure 1:
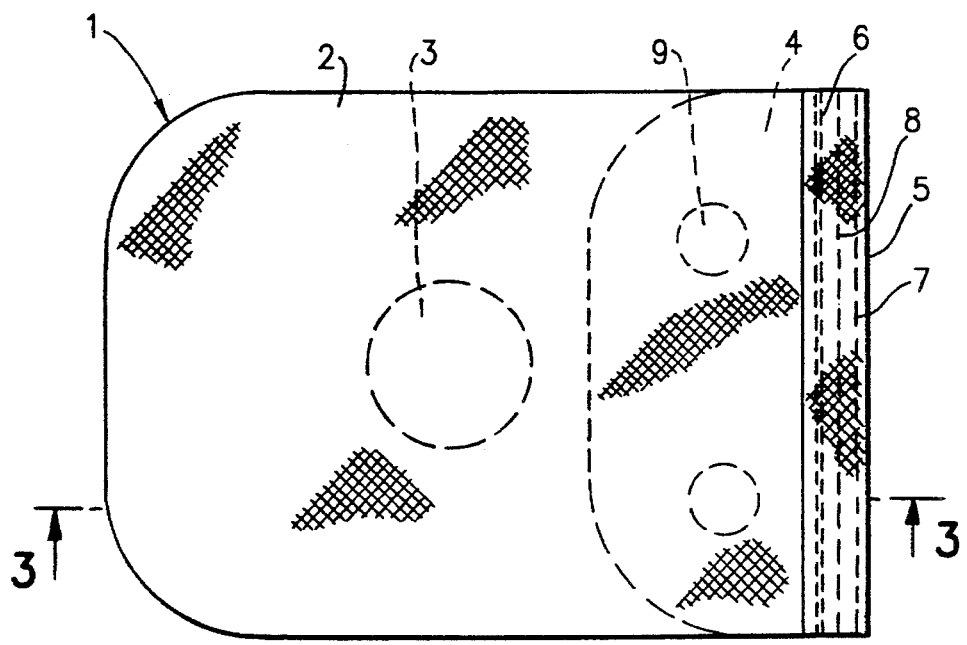
FIGS. 1 and 2 are top plan views of airbag structures embodying the invention, the airbag being in its stored or undeployed condition in FIG. 1 and in its deployed condition in FIG. 2.

A preferred embodiment is illustrated in FIGS. 1 to 4. In FIG. 1, a completely collapsed or undeployed airbag 1 is shown. The airbag comprises an airbag wall 2 which encloses an inflation chamber 16 (FIG. 3). In FIG. 1 the inflation chamber is completely collapsed and upper and lower fabric panels 2a and 2b (see FIG. 3) of the wall 2 lie essentially together. Shown in the lower panel, underneath the upper panel, is a mouth 3 which is an opening in the airbag wall 2 for gas flow between the inflation chamber 16 of the airbag 1 and an inflator 11. At one portion of the periphery of the airbag 1, the airbag wall 2 has been turned inward at fold lines 8 and a portion 4 of the wall has been tucked inside the inflation chamber 16. The portion 4 is held inside by two fabric strips 5 which run lengthwise alongside fold lines 8. The two strips 5 are stitched respectively to the outside of the upper and lower panels 2a and 2b of the airbag wall 2 by permanent (i.e. normally unbreakable during airbag deployment) stitching 6 along lines generally parallel to the fold lines 8. Each strip 5 is wide enough to extend only slightly outward beyond the fold lines 8 and the distal ends of the two strips 5 are bound together by a weak or readily breakable (low tensile strength) seam 7 of stitching or other suitable weak binding means along a line outside the fold lines. The strips 5, while they are joined by the weak seam 7, effectively prevent the tucked in portion 4 of the airbag wall 2 from contributing to the available volume in the inflation chamber 16.

Optionally, vent openings 9 or other means for more rapidly deflating the airbag may be provided in the walls of the tucked in portion 4 of the airbag 1. Another means for accelerating deflation of the airbag, once the portion 4 has been deployed, is to make the portion 4 from a gas permeable fabric through which inflation gas can escape after the portion 4 has been deployed.

Figure 2:
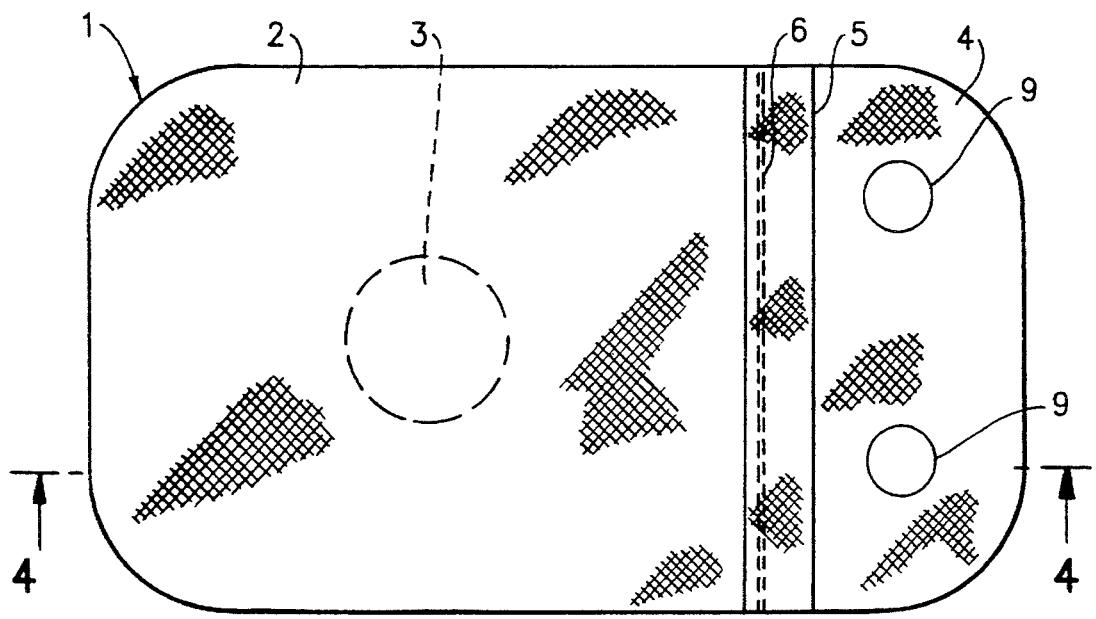

FIG. 2 is a plan view showing the airbag 1 in FIG. 1 in its fully deployed condition. The weak seam 7 of stitching has broken open during a later stage of the inflation of the airbag by stress in the airbag wall caused by pressure of inflation gas in the inflation chamber 16. With the rupture of seam 7, the portion 4 of the airbag wall 2 that was tucked inside the bag emerges from the inflation chamber, increasing the volume capacity of the inflation chamber 16 by the extra volume of gas that the airbag 1 can contain with the portion 4 of the airbag wall 2 deployed.

FIG. 3 shows the airbag 1 connected to an inflator The airbag has been deployed from its container (not shown) and is just beginning the first stage of inflation. The mouth 3 of the airbag 1 is fitted around a circular diffuser 10 at one end of the inflator 11. In operation, the inflator 11 rapidly produces gas which is delivered to the inflation chamber 16 of the airbag 1 through the diffuser 10. The edges of the airbag 1 around its circular mouth 3 are bound between a retaining ring 12 inside the airbag and a mounting plate 13 outside the airbag. Studs 15 on the retaining ring 12 hold this retaining assembly together. The studs 15 extend outward from the ring 12 through stud holes in the airbag 1, in the mounting plate 13 and in a flange 14 which is attached to the inflator 11 outside the airbag. The studs 15 are fastened to the flange 14 on the inflator 11. In FIG. 3 the tucked in portion 4 of the airbag wall is held inside the inflation chamber 16 by the strips 5, still sewn together by binding means 7. During this stage of the inflation of chamber 16, the volume capacity of the tucked in portion 4 of the airbag is unavailable for inflation.

FIG. 4 shows the airbag 1 after it has been inflated enough so that stress in the airbag wall 2, caused by pressure in chamber 16, has torn open the weak seam 7 which joined the two strips 5 together. Pressurized gas in the airbag inflation chamber 16 is now deployed into the tucked in portion 4 of the airbag wall 2 and that portion 4 became a part of the outer wall 2, defining an expanded inflation chamber 16. Expansion of the volume capacity in the inflation chamber 16 causes rapid decrease of gas pressure in the expanded inflation chamber 16. In the embodiment shown in FIGS. 3 and 4, that portion 4 of the airbag wall 2 has vents 9 in the wall. These allow gas to escape when the portion 4 has been deployed, thereby increasing the rapidity with which the pressure inside the airbag 1 is reduced. With an airbag of the construction described, an inflator that has rapid and high output of gas can be used so the airbag can deploy and begin its inflation very quickly, and then the airbag can expand and soften before being struck by a passenger, to prevent injury to the passenger from striking a cushion that is too hard and also to prevent further rebound.

Figure 5:
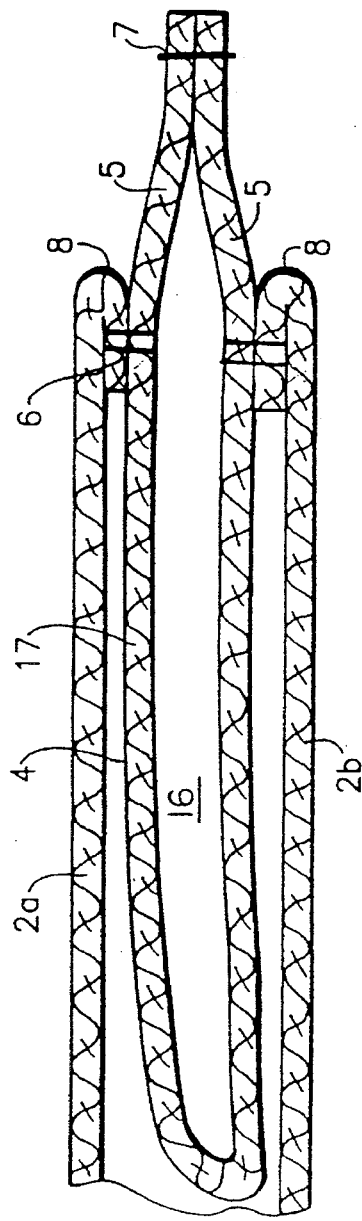
FIGS. 5 and 6 are cutaway sections showing a variation of the hidden portion of the airbag structures, FIG. 5 showing the airbag with the hidden portion undeployed and FIG. 6 with that portion deployed.
Figure 6:
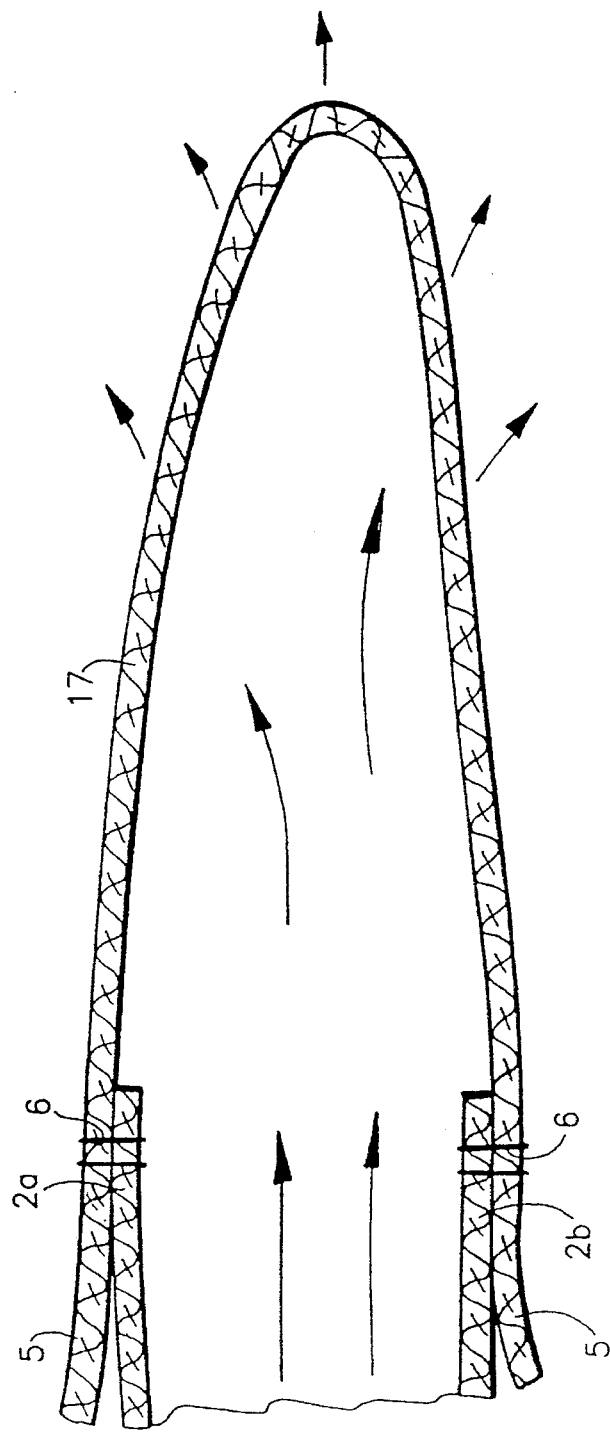

FIGS. 5 and 6 illustrate a variation of the airbag 1 shown in FIGS. 1 to 4. Only the part of the airbag near the tucked in portion 4 is shown in FIGS. 5 and 6. The tucked in portion 4 comprises a separate bag 17 having an open end. This separate bag 17 may be made from a gas permeable fabric for controlled deflation of the airbag when desired. A corresponding open end of the airbag 1 is provided between the top and bottom layers 2a and 2b of the airbag. To assemble the parts, the separate bag 17 at its open end is slipped over the open end of the airbag 1 and the walls of the airbag 1 and separate bag 17 are joined by a permanent seam 6 near the open ends of the two bags, but leaving a wide enough portion of the wall of the separate bag 17 at the open end thereof outside the permanent seam to be used as strips 5. Then the separate bag 17 is tucked inside the airbag 1 creating fold lines 8 in layers 2a and 2b as shown in FIG. 5 and the strips 5 are joined at their distal ends by a weak seam 7 slightly outside said fold lines.

In a variation shown in FIGS. 7 and 8, the separate bag 17 at its open end is slipped inside the open end of the airbag 1 and the wall near the open end of the bag is joined by a permanent seam 6 to airbag wall 2, leaving portions of the walls 2a and 2b at the open end of the airbag outside the permanent seam 6, to be used as strips 5. When the separate bag 17 is tucked inside the airbag 1 creating fold lines 8, the strips 5 are joined by a weak seam 7 outside the fold lines, as described before. Release of the weak seam 7 and deployment of the tucked in portion 4 is the same as described above.

The term "weak seam" as used herein defines a line of stitching or other suitable means for binding the strips together so that the seam can be broken by tension in the airbag wall that is caused by a certain level of gas pressure in the airbag. When the two strips 5 are bound together they are tensed with the airbag wall 2 as the bag is being inflated. As pressure in the airbag increases, tension in the wall 2 and the strips 5 increases until the weak seam 7 is broken by the tension. Then the strips 5 separate and the tucked in portion 4 (or 17) is deployed and becomes a part of the outer airbag wall 2. A preferred weak seam is a single line of single needle lock stitching, six stitches per inch. Other suitable means for binding the weak seam can include a weak heat sealed seam or a weak line of staples, designed to separate under the tension that is developed in the airbag wall as the airbag is inflated.

An advantage of the invention is that the tucked in portion of the airbag wall will not begin to deploy and inflate until the pressure in the airbag has increased to a pressure sufficient to stress the airbag wall and consequently stress the strips enough to break the weak seam. The weak seam can be designed to break at the tension caused by any desired inflation pressure usually in the range from about 5 psig to about 35 psig, in order to relieve excessive pressure which would make the airbag too hard. A preferred pressure range for breaking the weak seam is from about 15 psig to about 30 psig and in most cases the desired inflation pressure for breaking the weak seam will be about 25 to 30 psig.

For the permanent seams that bind the strips to the airbag wall, any suitable permanent binding means can be used. A preferred seam is a permanent double chain stitch for the permanent seams. Other suitable permanent seam binding means can include a strong heat sealed permanent seam, or strong line of staples or the like. In some embodiments, the strips may be extended ends of a member of the airbag wall, as shown in FIGS. 5-8.

In one use of the invention, the airbag is positioned in the airbag module so the airbag will be deployed with the tucked in portion at the lower end of the deployed airbag. The subsequent deployment and inflation of the tucked in portion of the airbag wall directs that portion downward towards the lap of a driver or passenger seated behind the airbag. In another use, the airbag is used as a side impact restraint. The first inflation stage inflates the initial inflation chamber 16 of the airbag, but the hidden volume portion is not deployed until after the airbag is struck by the side of a passenger's torso. Pressure increases in the initial inflation chamber of the airbag when it is struck by a passenger's torso, causing weak binding seam 7 to break whereby the hidden volume of the tucked-in cushion portion is caused to deploy for added restraint of the passenger's neck and head area.

In other embodiments of the invention an airbag may be made with more than one tucked in portion with each held inside the airbag by strips bound together by a weak seam, in the manner described above.

The invention may be used in airbags designed for use on either the passenger side or the driver side in an automobile passenger safety system or as a side impact restraint.

With the foregoing description of the invention, those skilled in the art will appreciate that modifications may be made to the invention without departing from the spirit thereof. Therefore, it is not intended that the scope of the invention be limited to the specific embodiments illustrated and described.

The foregoing and other variations and equivalents of the invention described are within the intended scope of the invention defined by the following claims.

We claim:

1. An airbag for use in an airbag restraint system for automobile passenger safety, said airbag comprising:
   a first fabric wall enclosing an inflation chamber for inflation by gas from an inflator, said first fabric wall having a mouth for flow of gas from an inflator into the inflation chamber, a second fabric wall received and stored within the inflation chamber so as to be unavailable for contributing to volume capacity of the enclosed chamber during an initial stage of inflation of said airbag, but capable of contributing to volume capacity of the inflation chamber during a later stage of inflation of said airbag, and
   opposed strip means having first ends non-rupturably joined to said first and second fabric walls, said opposed strip means further having second ends rupturably joined together by a weak seam located outside the enclosed inflation chamber, said weak seam being rupturable at a predetermined level of gas pressure in said airbag inflation chamber, whereby rupture of said weak seam causes the second fabric wall to become available for contributing volume capacity, along with the first fabric wall, to increased volume capacity of the inflation chamber.

2. An airbag according to claim 1 wherein the said second fabric wall has at least one vent opening in said second fabric wall.

3. An airbag according to claim 1 wherein said opposed strip means comprise two separate fabric strips of material, separate from said first and second wall fabrics, said first ends of said two separate fabric strips being non-rupturably stitched to the first fabric wall on a portion of that fabric wall other than the portion comprising the second fabric wall and said second ends of said two fabric strips are stitched together.

4. An airbag according to claim 1 wherein said first fabric wall and said second fabric wall comprise a unitary fabric wall, and said second fabric wall comprises a portion of the first fabric wall folded along a fold line and tucked into the inflation chamber, and said first ends of said opposed strip means are non-rupturably joined to a portion of said first fabric wall not comprising the second fabric wall and parallel to the fold line.

5. An airbag according to claim 4 wherein the opposed strip means are non-rupturably joined to said first fabric wall by a line of permanent stitching.

6. An airbag according to claim 5 wherein the weak seam of the opposed strip means comprises a line of rupturable stitching.

7. An airbag according to claim 6 wherein the line of rupturable stitching breaks at an airbag inflation pressure in the inflation chamber within the range of from about 5 to about 35 psig.

8. An airbag according to claim 7 wherein the line of rupturable stitching breaks at an airbag inflation pressure in the inflation chamber within the range of from about 25 to about 30 psig.

9. An airbag according to claim 1 wherein said second fabric wall comprises a fabric wall separate from said first fabric wall, and a portion of said second fabric wall comprises the opposed strip means.

10. An airbag according to claim 9 wherein said second fabric wall has at least one vent opening in said second fabric wall.

11. An airbag according to claim 9 wherein said second fabric wall comprises a bag-shaped piece of fabric having a mouth, said weak seam rupturably closing said second fabric mouth outside the inflation chamber, substantially all of said second fabric bag, other than the stitched closed mouth thereof, positioned within the inflation chamber of the airbag and being non-rupturably joined to the first fabric wall of the airbag at a location essentially adjacent the weak seam closing the mouth of the bag-shaped piece of fabric.

12. An airbag according to claim 9 wherein the opposed strip means are non-rupturably joined to said first fabric wall by a line of permanent stitching.

13. An airbag according to claim 12 wherein the weak seam of the opposed strip means comprises a line of rupturable stitching.

14. An airbag according to claim 13 wherein the line of rupturable stitching breaks at an airbag inflation pressure in the inflation chamber within the range of from about 5 to about 35 psig.

15. An airbag according to claim 14 wherein the line of rupturable stitching breaks at an airbag inflation pressure in the inflation chamber within the range of from about 25 to about 30 psig.

16. An airbag according to claim 1 wherein the opposed strip means are non-rupturably joined to said first fabric wall by a line of permanent stitching.

17. An airbag according to claim 16 wherein the weak seam of the opposed strip means comprises a line or rupturable stitching.

18. An airbag according to claim 16 wherein the line or rupturable stitching breaks at an airbag inflation pressure in the inflation chamber within the range of from about 5 to about 35 psig.

19. An airbag according to claim 18 wherein the line of rupturable stitching breaks at an airbag inflation pressure in the inflation chamber within the range of from about 25 to about 30 psig.

* * * * *